Figure 1:
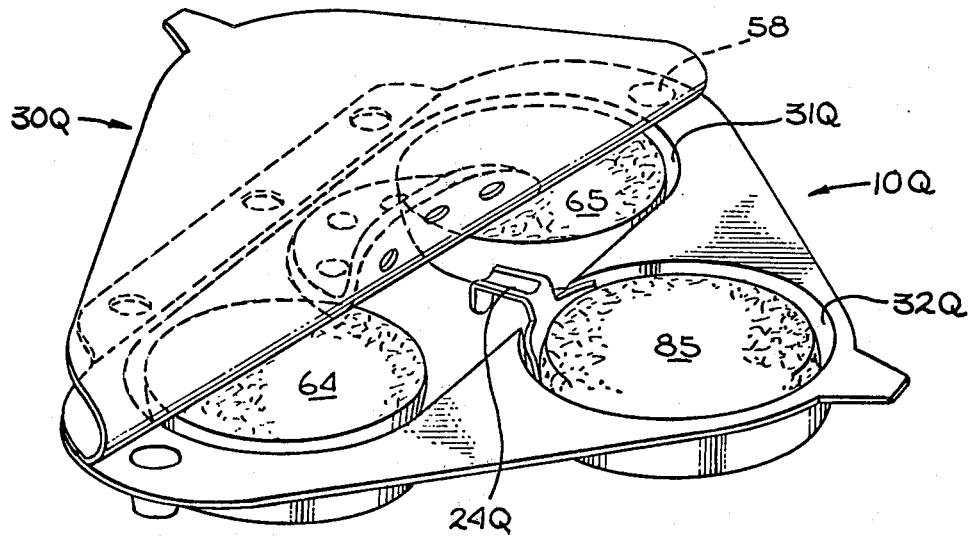

United States Patent [19]

Daswick

[11] 4,172,903
[45] Oct. 30, 1979

[54] METHOD OF COOKING FOOD IN A PACKAGE

[76] Inventor: Alexander C. Daswick, 647 Orange Grove, South Pasadena, Calif. 91030

[21] Appl. No.: 914,237

[22] Filed: Jun. 8, 1978

Related U.S. Application Data

[60] Division of Ser. No. 654,712, Feb. 3, 1976, Pat. No. 4,137,333, which is a continuation-in-part of Ser. No. 209,738, Dec. 31, 1971, abandoned.

[51] Int. Cl.$^2$ .......................................... B65B 25/22
[52] U.S. Cl. ..................................... 426/394; 426/113; 426/395
[58] Field of Search ............... 426/107, 113, 114, 118, 426/120, 396, 394, 412, 395, 392, 523, 106, 234

[56] References Cited

U.S. PATENT DOCUMENTS

| | | | |
|---|---|---|---|
| 2,674,536 | 4/1954 | Fisher | 426/114 |
| 2,777,769 | 1/1957 | Hodges | 426/113 |
| 2,915,397 | 12/1959 | Telkes | 426/394 X |
| 3,079,913 | 3/1963 | Nelson | 426/114 |
| 3,219,460 | 11/1965 | Brown | 426/114 X |
| 3,228,776 | 1/1966 | Savage et al. | 426/114 |
| 3,465,873 | 9/1969 | Munz | 426/114 X |
| 3,741,427 | 6/1973 | Doyle | 426/113 X |
| 3,751,629 | 8/1973 | Eisler | 426/113 X |

OTHER PUBLICATIONS

Quick Frozen Foods 7/57.

*Primary Examiner*—Steven L. Weinstein
*Attorney, Agent, or Firm*—Gene W. Arant; Thomas I. Rozsa

[57] ABSTRACT

A method of cooking food in a package is disclosed. A metal foil container provides two adjacent compartments so that meat can be placed in one and bread in the other. The bread compartment is vented to atmosphere, and there is communication between the two compartments. Cooking of the meat generates cooking gases which flow through the bread compartment, warming and moistening the bread before escaping to atmosphere.

3 Claims, 4 Drawing Figures

METHOD OF COOKING FOOD IN A PACKAGE

IDENTIFICATION OF REFERENCED PATENT

The present application is a division of my co-pending prior application Ser. No. 654,712 filed Feb. 3, 1976 now U.S. Pat. No. 4,137,333 issued Jan. 30, 1979. Application Ser. No. 654,712 was a continuation-in-part of my still earlier application Ser. No. 209,738 filed Dec. 31, 1971, and subsequently abandoned.

The entire drawings and specification of the patent are incorporated herein by reference in order to provide a full and complete disclosure of the present invention.

SUMMARY OF THE INVENTION

The present invention provides a method of cooking a meat sandwich. More particularly, the invention pertains to a method in which a metallic package is selected which has at least two separate compartments, one of which is vented; placing a piece of bread in the vented compartment; placing a piece of meat in the unvented compartment; and then applying heat to the meat compartment so that as the meat cooks the cooking gases generated from it will flow around the bread and will moisten and warm the bread prior to the escape of cooking gases through the vent to atmosphere.

The invention also provides a packaged meat product including a metallic meat package having at least two separate compartments, one of which is vented and one of which is unvented; a piece of meat in the unvented compartment; and a piece of bread in the vented compartment.

An object of the present invention is to provide a meat product which is prepared and packaged in such a manner that it may be shipped and cooked in the same package, and the cooking thereof in a highly portable type of stove or oven will still comply with health and sanitary requirements.

A further object of the present invention is to provide a package so arranged that the cooked food product therein may be quickly and conveniently removed from the package for the purpose of serving and eating the same.

A still further object of the invention is to provide a packaged meat product having therein a filter vent to permit the escape of cooking gases, the filtering of the gases making it possible to utilize a highly portable type of stove or oven while still meeting the health and sanitary regulations.

DRAWING SUMMARY

Figure 2:
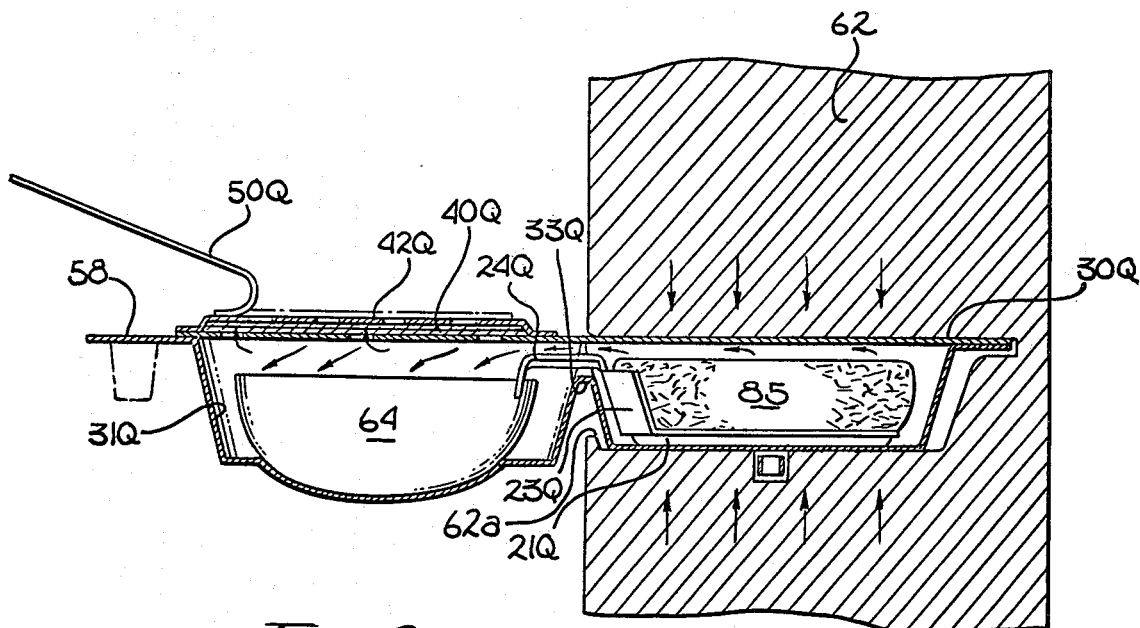
Figure 3:
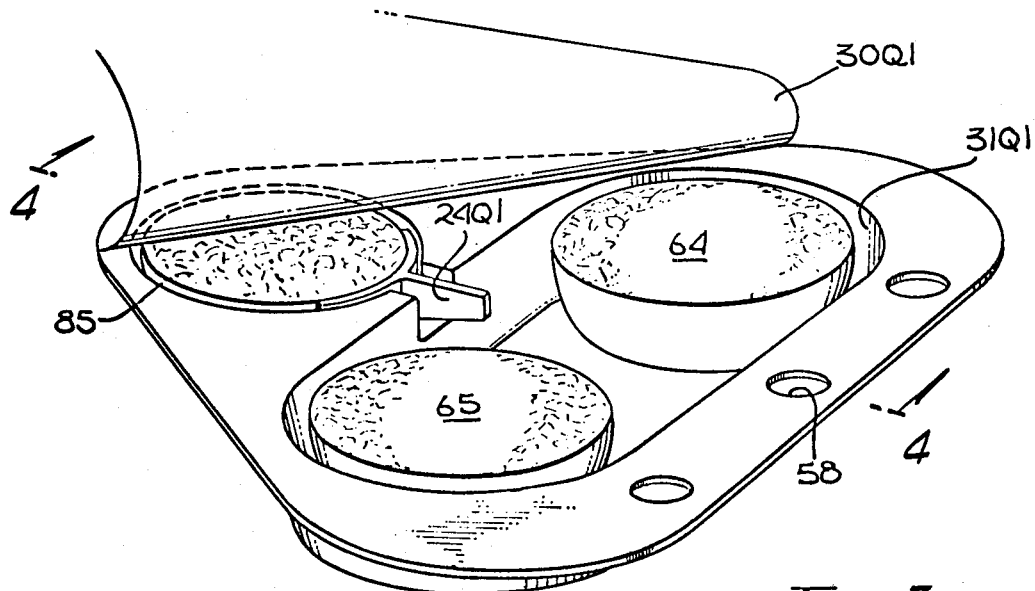
Figure 4:
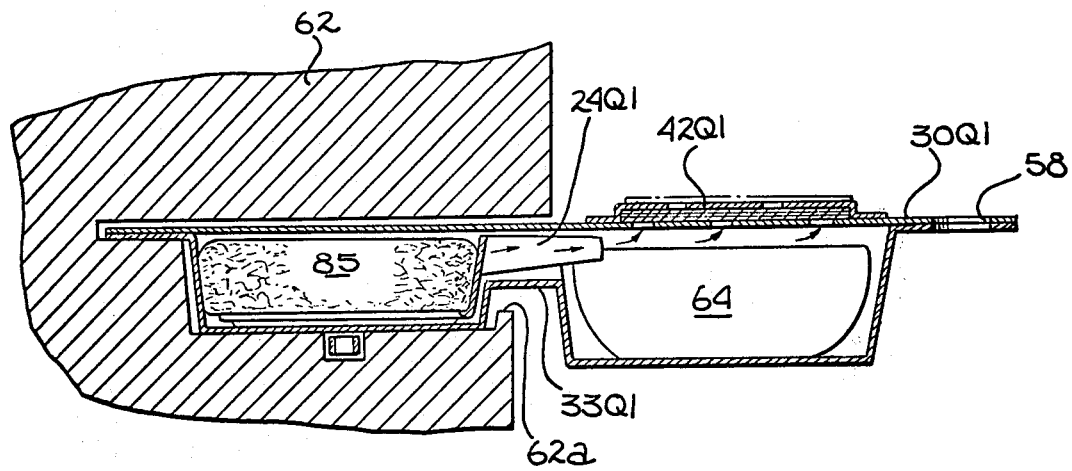

FIGS. 1 through 4, inclusive, herein correspond to FIGS. 65 through 68, inclusive, of my above referenced patent, and illustrate the presently preferred form of the invention:

What is claimed is:

1. The method of packaging and cooking a meat sandwich, comprising the steps of:
   selecting a metallic pacakge having at least two separate compartments which are fully enclosed except for communicating means between them and vent means in one of them,
   with a piece of bread contained in said vented compartment and a piece of meat contained in the unvented compartment;
   and then applying direct heat only to the meat compartment portion of the package, so that as the meat cooks the cooking gases generated therefrom will flow through the communicating means and then around the bread and will moisten and warm the bread prior to escaping through the vent to the atmosphere.

2. The method of cooking and serving a prepackaged meat product comprising the steps of:
   selecting a metallic package having a meat compartment with two opposing sides and a separate bread compartment which extends outwardly from one extremity of the meat compartment, and which is fully enclosed except for internal passageway means between the two compartments,
   with a piece of meat contained in the meat compartment and at least one piece of bread contained in the bread compartment;
   said bread compartment having associated with it vent means;
   placing a pair of metal jaws on the opposing sides of the meat compartment and in heat conductive engagement therewith;
   applying heat to the metal jaws so that cooking gases generated by heating the meat flow through the passageway means past the bread before escaping to the atmosphere through the vent means and continuing the application of heat until the meat is cooked; and
   thereafter removing the meat compartment from the metal jaws, and then opening the package and assembling the meat and bread into a meat sandwich.

3. The method of claim 2 wherein said package is essentially a flat tray laterally divided into compartments.

* * * * *